April 30, 1940.   F. W. M. LEE   2,199,052
MEASURING GAUGE
Filed Nov. 29, 1938   2 Sheets-Sheet 1

April 30, 1940.  F. W. M. LEE  2,199,052
MEASURING GAUGE
Filed Nov. 29, 1938  2 Sheets-Sheet 2

Inventor
Frederick Walter Madeley Lee,
By Richard E. Babcock
Attorney

Patented Apr. 30, 1940

2,199,052

UNITED STATES PATENT OFFICE 2,199,052

MEASURING GAUGE

Frederick Walter Madeley Lee, Coventry, England

Application November 29, 1938, Serial No. 243,017
In Great Britain December 10, 1937

3 Claims. (Cl. 33—178)

This invention relates to gauges for measuring or checking the sizes of holes of even or uneven contour, or the outside dimensions of articles having an even or uneven contour and has for its object to facilitate the gauging operation and to protect the gauge from damage in use.

When gauging parallel holes to fine limits with a plug gauge it is often very difficult to insert the gauge in and sometimes to withdraw it from the hole. The difficulty increases with the diameter of the gauge and the fineness of the limit. Unless the gauge is applied with its axis in substantial alignment with that of the work to be gauged it is practically impossible to engage the one with the other, the permissible deviation or tilting from absolute axial alignment decreasing with the diameter of the gauge and the fineness of the limit. If the permissible deviation is exceeded the gauge will either not enter or engage the work at all or will jam, thereby causing damage to the gauge and work and in the case of plated gauges the plating or covering may be lifted. The above remarks apply equally to the withdrawal of the gauge.

According to the present invention the difficulty above referred to is entirely avoided, irrespective of the diameter of the gauge, and the fineness of the limit, by providing or forming the end of the gauge with a pilot which is formed by backing off the said end of the gauge to an extent sufficient to allow the said end to enter the hole, or to engage the work, as the case may be, without any tendency to bind or jam. The axial plane section contour of the pilot may be convex or of any other suitable shape that will allow the gauge to rock on insertion in the hole or over the work.

In the case of a plug gauge the maximum diameter of the pilot is the same as that of the gauge, and in the case of a ring gauge is the same as the internal diameter of the gauge. In either case the pilot may be made as a separate part and secured to the gauge in any suitable manner.

If desired, the gauge may be provided with a pilot at each end so as to facilitate withdrawal of the gauge in the event of its having been passed complely through or over the work.

The invention is, of course, equally applicable to combined "go" and "not go" gauges as to single gauges, and to gauges of non-circular contour, such as spline and square or rectilinear gauges, and in fact to all kinds of parallel plug and ring gauges.

In the acompanying drawings.

Figure 3:
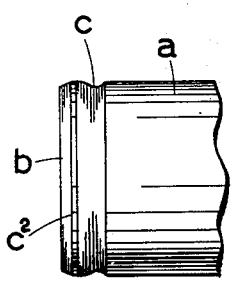
Figure 4:
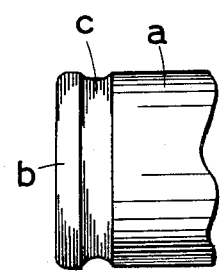
Figure 5:
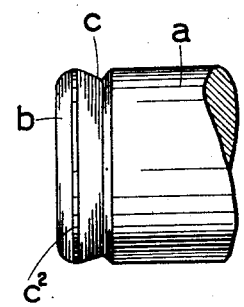

Figures 3, 4, and 5 are sectional views of gauge ends illustrating alternative forms of backing-off.

Figure 6:
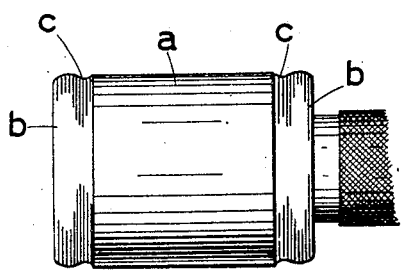

Figure 6 shows the application of the pilot to each end of the gauging portion of a plug gauge.

Figure 7:
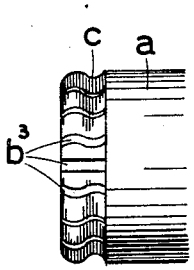

Figure 7 illustrates a fluted pilot.

Figure 8:
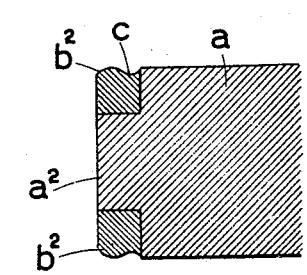

Figure 8 shows the pilot as a separate part fitted to the gauge.

Figure 9:
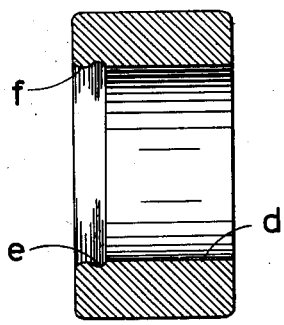
Figure 10:
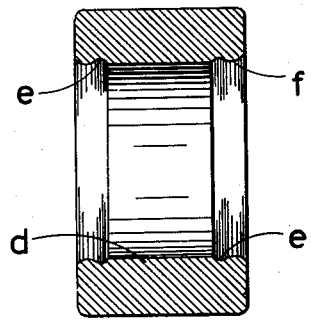

Figures 9 and 10 are sectional views of ring gauges having a pilot at one and both ends respectively.

Figure 11:
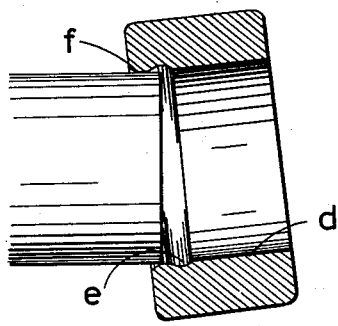

Figure 11 illustrates the function of the pilot when applying a ring gauge to the work.

Figure 12:
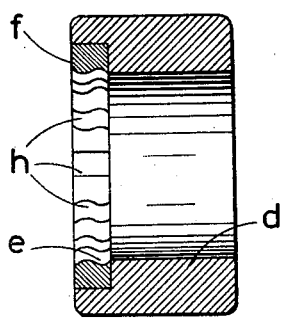

Figure 12 is a sectional view of a ring gauge showing the pilot made as a separate piece and fitted thereto.

Figure 13:
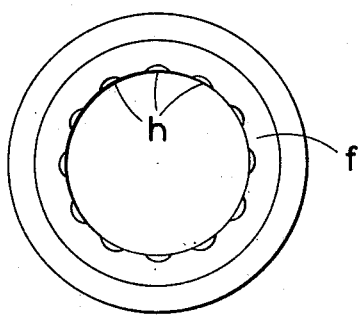

Figure 13 is a face view of a ring gauge with a fluted pilot.

Figure 1:
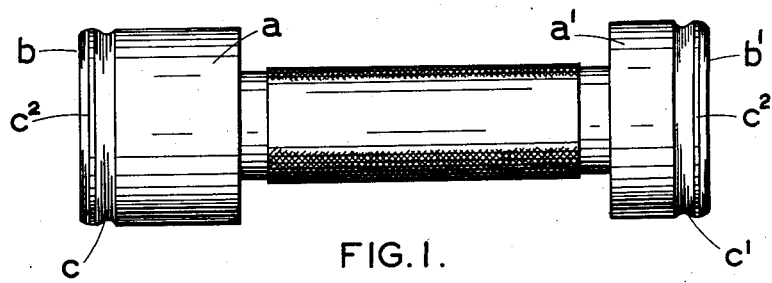
Figure 1 illustrates the application of the invention to the orthodox type of "go" and "not go" plug gauge.

In the example illustrated in Figure 1 the entering ends of the "go" and "not go" portions $a$, $a^1$ of a parallel plug gauge for use in gauging the diameters of holes, are each of ogee shape in axial plane section with the convex portion at the free end so as to form a pilot $b$, $b^1$ which is formed by backing-off the said ends by means of annular grooves $c$, $c^1$. The axial plane section of the pilot may be convex, as shown, with a narrow land $c^2$ of a diameter equal to the diameter of the parallel part of the gauge.

Figure 2:
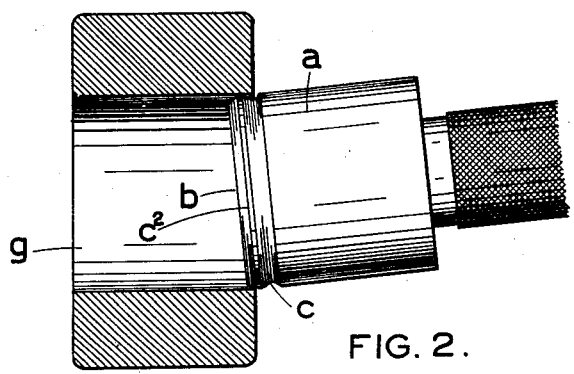
Figure 2 is a sectional view illustrating the function of the pilot when inserting the improved gauge into a hole.

The great advantage of the pilot when inserting the gauge $a$ in the hole $g$ is shown in Figure 2, where it will be seen that the pilot $b$ can be readily introduced into the hole without any risk of a jam although the deviation or tilting from axial alignment of the gauge and hole may greatly exceed that which would be permissible for the present type of plug gauge of the same diameter and with the same limit. The backing-off grooves $c$, $c^1$ may take a variety of forms in cross-section, such as concave, as shown in Figures 1, 2, 3 and 4, or approximately V-shape, as shown in Figure 5, so that when the pilot is engaged in the hole the gauge can be rocked or tipped to the extent allowed for by the depth of the groove without any risk of binding and may be pushed further into the hole by the chamfer of the groove bringing the axis of the gauge into line with that of the said hole.

If desired, the gauge may, as shown in Figure 6, be provided with a pilot $b$ at each end so as to facilitate withdrawal of the gauge in the event of its being passed completely through the hole.

The pilot may either be made as an integral part of the gauge or as a separate piece and secured thereto in any suitable manner. For example, as shown in Figure 7 the gauge can be formed with a reduced portion $a^2$ adapted to receive the pilot $b^2$. In such cases the pilot may be made of a different material than that of the gauge.

If desired, the pilot may be formed with flutes $b^3$, as shown in Figure 8, or otherwise formed to provide local areas of contact with the hole.

The front edge of the pilot may be sharp, but is preferably radiussed, or chamfered as shown to give a lead to facilitate engagement with the hole.

What has been above described with reference to plug gauges is equally applicable to ring gauges for measuring or checking outside dimensions. For example, as shown in Figures 9 and 10, one or both ends of the gauge hole $d$ is backed-off by means of a groove $e$ to form a pilot $f$ having an axial plane section which may be convex or of any other suitable shape and a minimum diameter which is the same diameter as that of the gauge hole. The edge of the receiving end of the hole may, as in the case of the plug gauge, be sharp or radiussed; chamfered or otherwise formed to give a lead to facilitate engagement of the gauge with the work. The advantage of the pilot in the case of ring gauges is illustrated in Figure 11 where it will be seen that the pilot of the receiving end of the gauge can be readily applied to the work without any tendency for the gauge to jam although the deviation or tilting of the gauge from axial alignment with the work may greatly exceed that which would be permissible for the present type of ring gauge of the same nominal diameter and with the same limit. When the pilot is engaged with the work the gauge may be rocked or tipped to the extent allowed for by the depth of the backing-off groove $e$ without any risk of binding and may be readily pushed further onto the work by bringing the axis of the gauge into line with that of the work.

As above described in connection with plug gauges, the pilot or pilots in the case of a ring gauge may also be made as a separate part as shown in Figure 12 and of any suitable material, and can be formed with flutes $h$, Figure 13, to give local areas of contact with the work.

In order to protect the surface of the gauge against wear and ill treatment it may be coated with a material, different from that of the gauge itself, such as stellite or chromium. The coating is confined to the gauging portion only.

I claim:

1. A measuring gauge consisting of a standard gauge portion formed with an annular groove of V-shape in cross-section adjacent its free end, to form a pilot, said pilot itself being of convex shape in cross-section with a narrow land of a diameter equal to the diameter of the standard gauge portion.

2. A measuring gauge consisting of a standard gauge portion formed with an annular groove of V-shape in cross-section adjacent its free end, to form a pilot, said pilot itself being of convex shape in cross-section.

3. A measuring gauge consisting of a standard gauge portion formed with a peripheral groove to form a pilot, said pilot itself being of substantially convex shape in cross-section, and the wall of said groove presented toward said pilot inclining lengthwise of the gauge from a point adjacent to said pilot and below the plane of the main gauging face of the body of said gauge toward said main gauge face and into the plane thereof.

FREDERICK WALTER MADELEY LEE.